United States Patent Office 3,352,048
Patented Nov. 14, 1967

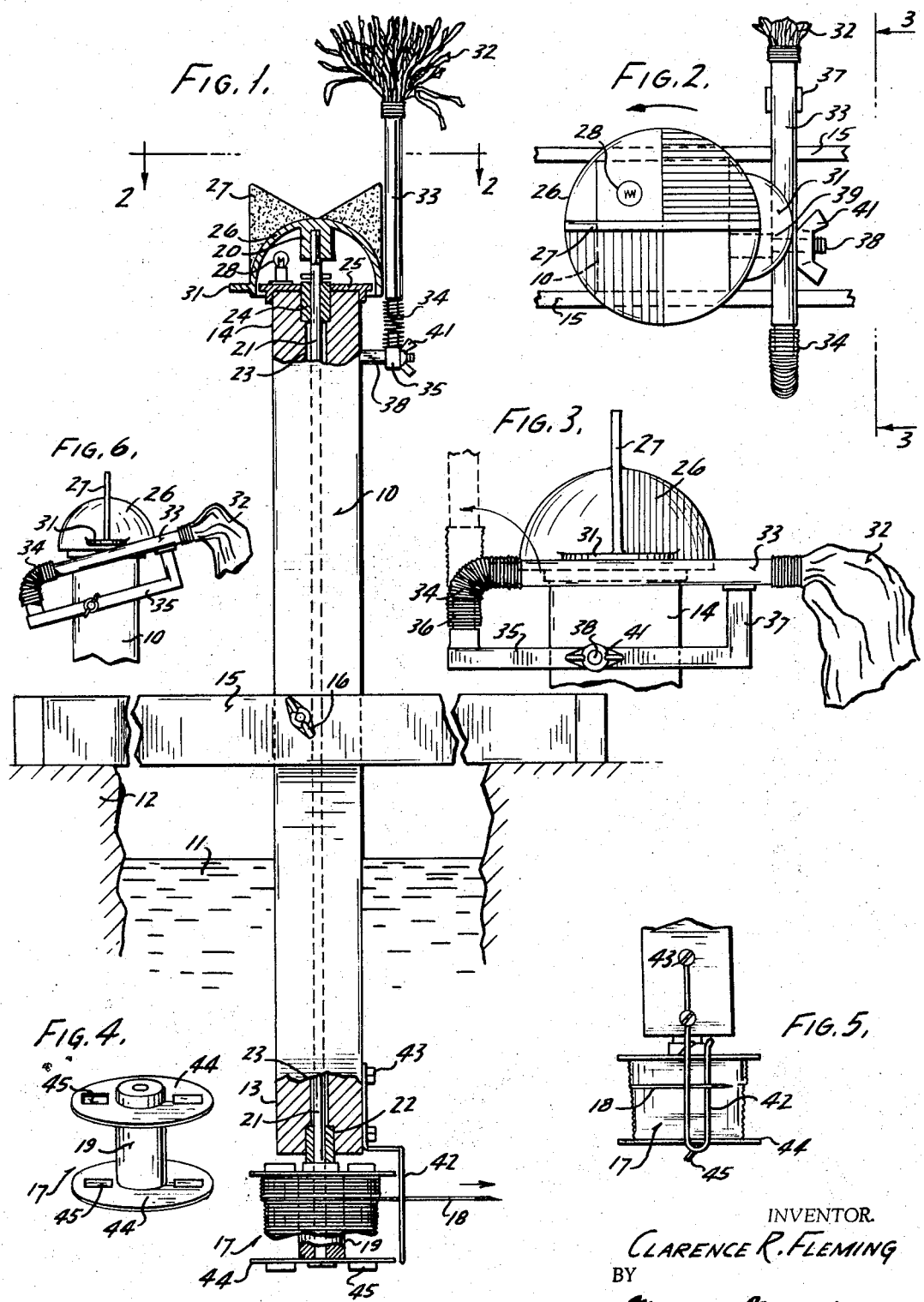

3,352,048
ICE FISHING TIP-UPS
Clarence R. Fleming, Rte. 1, Box 20,
Mukwonago, Wis. 53149
Filed Feb. 8, 1965, Ser. No. 430,923
7 Claims. (Cl. 43—17)

ABSTRACT OF THE DISCLOSURE

An ice fishing tip-up including a rotatable vertical shaft provided with a fish line reel on its lower end having anti-backlash fins, and a dome-like member having a light therewithin is mounted on the shaft upper end to rotate therewith and to provide a visual indication of a strike. The dome has a trigger element which normally holds an adjustably mounted, spring-urged flag staff in a horizontal, retracted position, but in the event of a strike said trigger element rotates out of engagement therewith to permit said flag staff to assume an upright position further alerting the fisherman of the strike.

---

This invention relates to an improvement in ice fishing tip-ups.

The ice fishing tip-up of the present invention is characterized by several important features. These are:

(1) An adjustable brake for the reel so that the tip-up can be set for catching fish of various sizes.

(2) A novel strike indicator and trigger mechanism responsive to reel rotation.

(3) The provision on the reel of anti-backlash fins.

(4) A flashing light indicator for night fishing.

The features of the present invention are incorporated in a tip-up construction including a mast which is adapted to extend into the water through a hole in the ice. The mast has one end submerged and the other end visible. The fish line reel is at the submerged end of the mast and a fish strike indicator is at the visible end of the mast. There is a motion transmitting connection from the reel to the indicator whereby the indicator will respond to a fish strike to apprise the fisherman thereof.

Other objects, features and advantages of the invention will appear from the following disclosure in which:

FIGURE 1 is a side elevation, partly in vertical cross section, showing a tip-up embodying the present invention.

FIGURE 2 is a plan view of the device of FIGURE 1.

FIGURE 3 is a fragmentary side view looking in the direction of arrows 3—3 in FIGURE 2.

FIGURE 4 is a detailed perspective view of the fish line reel.

FIGURE 5 is a fragmentary elevation of the lower end of the mast showing the fish line guide.

FIGURE 6 is a view similar to FIGURE 3, but showing the indicator staff support member adjusted to a different position from that shown in FIGURE 3 and functioning as an adjustable brake.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

As best shown in FIGURE 1, the tip-up comprises an upright mast 10 which is adapted to extend into the water 11 through a hole 12 in the ice to have its lower end 13 submerged in the water and its upper end 14 visible. The mast 10 is supported on cross struts 15 pivotally connected to the mast 10 on the bolt fastener 16.

At its lower end 13 the mast is provided with a reel 17 upon which the fish line 18 is wound. The reel has a hub 19 fast to shaft 21 which may turn on bearings 22, 24 at the respective ends of center bore 23 in the mast 10.

The upper end 14 of the mast is capped by a cover plate 25. Shaft 21 extends beyond the cap plate 25 and is fastened to the hub 20 of a hemispherical rotor dome 26. Dome 26 may be made of translucent plastic or the like and is desirably provided with a radially projecting diametric fin 27. A lamp bulb 28 may be provided within the dome 26 to illuminate it so it is visible from a distance, at night. Lamp 28 may be energized by any convenient source, such as dry cell batteries (not shown).

Various quarter sectors of the hemispherical dome 26 may be colored differently, others left clear, and the fin 27 may also be colored. As dome 26 turns, lamp 28 will be visible through the different colored or clear sectors of the dome and the lamp 28 will "flash" different colors as the dome turns, to apprise the fisherman that the dome is turning. During daylight, the rotating dome also attracts the fisherman's eye as the different colored sectors and fin reflect sunlight, etc. Accordingly, dome 26 constitutes one form of strike indicator at the top of the mast.

Dome 26 is provided with a laterally projecting lip 31 which functions as a trigger for another form of strike indicator at the top of the mast. This includes a brightly colored flag or plume 32 or the like fastened to the end of a staff 33. Staff 33 is telescopically mounted on coil spring 34 in turn telescopically anchored to stud 36 on support arm or tension bar 35. The end of support arm 35 remote from the stud 36 is provided with a staff rest 37.

Support arm 35 is mounted on the upper end 14 of mast 10 on turn bolt 38 having a shoulder 39 to which the arm 35 is adjustably clamped by the wing nut 41. The angle at which the bar is clamped may be varied to predetermine the pull at which the flag will be erected. In other words, the operator can adjust the device to the position of FIG. 6 so that it will require the pull of a large fish to trip it, or it may, in the position of FIG. 3, respond to a very light tug on the line. Staff 33 can be retracted against the bias of spring 34 to its position shown in FIGURES 2 and 3 where it abuts rest 37, whereupon the trigger lip 31 on dome 26 can be rotated to overlie the staff 33, thus to cock the staff in retracted position.

When a fish strike occurs, the fish will run with the line 18 to turn reel 17, thus rotating shaft 21 and the dome 26 and turning the trigger 31 away from overlying relationship to the staff 33. As soon as the trigger 31 is released from engagement with the staff 33, spring 34 will project the staff 33 and its flag or plume 32 to advanced upright position, as shown in FIGURE 1, thus apprising the fisherman of a strike. In the course of this movement the dome will rotate to flash light (either reflected sunlight or from lamp 28), thus making a fish strike plainly evident to the fisherman, even at night.

An important feature of the present invention is the adjustability of the strike indicator support arm 35. FIGURE 6 shows the arm adjusted to an inclined position, the inclination shown in this figure being somewhat exaggerated to illustrate the point. When the arm is thus adjusted, the upward pressure of the staff 33 on the trigger 31 of the dome 26 will be increased and the shaft 21 will cramp somewhat in its bearings 22, 24. Accordingly, the strike indicator will offer greater frictional resistance to trigger disengagement than in the position of the parts shown in FIGURE 3.

In this manner the strike indicator functions as an adjustable brake means on reel rotation so that the tip-up can be set for various sizes of fish. With the parts oriented as shown in FIGURE 6, a greater pull on the line 18 will be required to release the trigger to indicate a strike. In this way, larger fish may be played on the line.

The reel 17 conventionally comprises side flanges 44 from which anti-backlash fins 45 are struck outwardly. These are inclined obliquely to the flanges 44, as best shown in FIGURE 5. The closed sides of the fins are more or less streamlined in the direction of rotation of the reel when the fish is running with the line, so as not to materially impede fish movement. However, the open sides of the fins are adapted to catch the water to impede reverse rotation of the reel, thus effectively preventing backlash and entanglement of the line.

The bore 23 through which shaft 21 extends is sealed at both ends by bearings 22, 24. The bore 23 is considerably larger than the shaft and is desirably filled with grease or oil to exclude water which might otherwise freeze the shaft to the mast. The fact that the bore is oversize means that even if some freezing occurs, the bond will not be as strong as it might be if the shaft were closer to the bore wall.

I claim:
1. An ice fishing tip-up comprising:
    a mast adapted to extend into the water through a hole in the ice to have one end submerged and the other end visible,
    a fish line reel at the submerged end of the mast,
    a fish strike indicator at the visible end of the mast,
    a motion transmitting connection between said reel and said strike indicator,
    said reel comprising side flanges having anti-backlash fins projecting therefrom.

2. The tip-up of claim 1 in which said fins are streamlined in the running direction of reel rotation and catch the water in the opposite direction of reel rotation.

3. An ice fishing tip-up comprising:
    a mast,
    a rotor at the upper end of the mast,
    means for turning the rotor in response to a fish strike,
    a lamp within the rotor,
    said rotor being translucent and having sectors colored differently so that when rotated the light will appear to flash different colors, whereby to apprise the fisherman of a strike.

4. An ice fishing tip-up comprising: a mast adapted to extend into the water through a hole in the ice and to have one end submerged and the other end visible; a fish line reel at the submerged end of said mast, said reel having a pair of spaced side flanges; anti-backlash fins on and projecting from said reel flanges; indicator staff-supporting means on and adjacent the upper end of said mast; an indicator staff pivotally supported by said staff-supporting means, said indicator staff being pivotal from a horizontal, retracted position to an upright, advanced position; spring means yieldably biasing said indicator staff toward its upright, advanced position; a dome member rotatably mounted on the upper, visible end of said mast; a trigger element on and projecting laterally from said rotatable dome member, said trigger element being positionable to overlie said indicator staff when the latter is in a substantially horizontal position to hold said staff cocked against the bias of said spring means, and said trigger element being rotatable with said dome to a position wherein it is out of engagement with said indicator staff and said staff is released and allowed to assume its upright, advanced position; and a shaft connecting said reel and dome member for causing said dome and the trigger element thereon to rotate in response to a fish strike.

5. The tip-up of claim 4 in which the reel anti-backlash fins are streamlined in the running direction of reel rotation and catch the water in the opposite direction of reel rotation.

6. The tip-up of claim 4 in which said dome member is provided with means for flashing light when rotating.

7. The tip-up of claim 4 wherein said indicator staff-supporting means includes an arm having an anchor for said spring means at one end and a rest for said retracted indicator staff at its other end.

References Cited

UNITED STATES PATENTS

| | | | |
|---|---|---|---|
| 2,114,529 | 4/1938 | Goodhue | 43—17 |
| 2,198,286 | 4/1940 | Krivutza | 43—17 |
| 2,451,693 | 10/1948 | Richards | 43—17 |
| 2,506,092 | 5/1950 | Lyons | 43—17 |
| 2,636,303 | 4/1953 | Feigley et al. | 43—17 |
| 2,654,176 | 10/1953 | Kachelski et al. | 43—17 |
| 2,876,579 | 3/1959 | Plouffe | 43—17 |

SAMUEL KOREN, *Primary Examiner.*

WARNER H. CAMP, *Examiner.*